US008410424B2

(12) United States Patent
Makarov et al.

(10) Patent No.: US 8,410,424 B2
(45) Date of Patent: Apr. 2, 2013

(54) MULTIPLE ION INJECTION IN MASS SPECTROMETRY

(75) Inventors: Alexander A. Makarov, Bremen (DE); Oliver Lange, Bremen (DE); Stevan R. Horning, Delmenhorst (DE)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 13/008,790

(22) Filed: Jan. 18, 2011

(65) Prior Publication Data

US 2011/0147582 A1 Jun. 23, 2011

Related U.S. Application Data

(63) Continuation of application No. 11/915,735, filed as application No. PCT/GB2006/001976 on May 31, 2006, now Pat. No. 7,880,136.

(51) Int. Cl.
*B01D 59/44* (2006.01)

(52) U.S. Cl. ........ 250/281; 250/282; 250/283; 250/288; 250/290

(58) Field of Classification Search .................. 250/281, 250/282, 283, 288, 290
See application file for complete search history.

(56) References Cited

FOREIGN PATENT DOCUMENTS

| | | | |
|---|---|---|---|
| JP | 2000-260389 | | 9/2000 |
| JP | 2003-346704 | A | 12/2003 |
| WO | WO 2004/068523 | A2 | 8/2004 |

OTHER PUBLICATIONS

Belov, et al ("Automated Gain Control and Internal Calibration with External Ion Accumulation Capillary Liquid Chromatography-Electrospray Ionization-Fourier Transform Ion Cyclotron Resonance," Anal. Chem 2003, 75, 4195-4205).*

Belov et al., "Automated Gain Control and Internal Calibration with External Ion Accumulation Capillary Liquid Chromatography-Electrospray Ionization-Fourier Transform Ion Cyclotron Resonance," Analytical Chem., vol. 75 ( No. 16), p. 4195-4205, (Jul. 8, 2003).

* cited by examiner

*Primary Examiner* — Michael Maskell
(74) *Attorney, Agent, or Firm* — Charles B. Katz

(57) ABSTRACT

This invention relates to mass spectrometry that includes ion trapping in at least one of the stages of mass analysis. In particular, although not exclusively, this invention relates to tandem mass spectrometry where precursor ions and fragment ions are analysed. A method of mass spectrometry is provided comprising the sequential steps of: accumulating in an ion store a sample of one type of ions to be analysed; accumulating in the ion store a sample of another type of ions to be analysed; and mass analysing the combined samples of the ions; wherein the method comprises accumulating the sample of the one type of ions and/or the sample of another type of ions to achieve a target number of ions based on the results of a previous measurement of the respective type of ions.

14 Claims, 3 Drawing Sheets

MULTIPLE ION INJECTION IN MASS SPECTROMETRY

CROSS-REFERENCE TO RELATED APPLICATIONS

The present application is a continuation under 35 U.S.C. §120 and claims the priority benefit of U.S. patent application Ser. No. 11/915,735, filed Nov. 27, 2007, which is a National Stage application under 35 U.S.C. §371 of PCT Application No. PCT/GB2006/001976 filed May 31, 2006. The disclosures of each of the foregoing applications are incorporated herein by reference.

FIELD OF THE INVENTION

This invention relates to mass spectrometry that includes ion trapping in at least one of the stages of mass analysis. In particular, although not exclusively, this invention relates to tandem mass spectrometry where precursor ions and fragment ions are analysed.

BACKGROUND OF THE INVENTION

In general, a mass spectrometer comprises an ion source for generating ions from molecules to be analysed, and ion optics for guiding the ions to a mass analyser. A tandem mass spectrometer further comprises a second mass analyser. In tandem mass spectrometry, structural elucidation of ionised molecules is performed by collecting a mass spectrum, then using a first mass analyser to select a desired precursor ion or ions from the mass spectrum, causing fragmentation of ions, and then performing mass analysis of the fragment ions using a second mass analyser. Generally, a mass analyser with accurate mass capability is preferable for the second mass analyser. It is often desirable to obtain a mass spectrum of precursor ions also using the accurate mass analyser, i.e. pass a sample of precursor ions to the accurate mass analyser without fragmentation.

The method can be extended to provide one or more further stages of fragmentation (i.e. fragmentation of fragment ions and so on). This is typically referred to as $MS^n$, with n denoting the number of generations of ions. Thus $MS^2$ corresponds to tandem mass spectrometry.

Tandem mass spectrometers can be classified into three types:

(1) sequential in space, corresponding to combinations of transmitting mass analysers (e.g. magnetic sectors, quadrupole, time-of-flight (TOF), usually with a collision cell in-between);

(2) sequential in time, corresponding to stand-alone trapping mass analysers (e.g. quadrupole, linear, Fourier transform ion cyclotron resonance (FT-ICR), electrostatic traps); and (3) sequential in time and space, corresponding to hybrids of traps or hybrids of traps and transmitting mass analysers.

This invention is particularly well suited for use with pulsed accurate-mass analysers, such as TOF analysers, FT ICR analysers and electrostatic trap (EST) analysers such as the Orbitrap mass analyser.

Most of these analysers have a short injection cycle followed by relatively long mass analysis stage, especially when operated at high resolution. Therefore, their sensitivity greatly benefits from using an intermediate ion store such as a RF multipole.

Frequently, accurate-mass analysers are preceded by stages of mass analysis, for example tandem mass spectrometry as described above. These first stages of mass spectrometry may include ion trapping in a quadrupole trap or any other known mass analyser. In these instances, use of an intermediate ion store avoids ion losses caused by differences in repetition rates and ion beam parameters between the different stages. Examples of tandem mass spectrometers including an intermediate ion store may be found in J. Proteome Res. 3(3) (2004) pp 621-626, Anal Chem. 73 (2001) p 253, WO2004/068523, US 2002/0121594, US2002/0030159, WO99/30350 and WO02/078046. Other tandem configurations are also possible.

Ion traps used as mass analysers are always sensitive to the total number of ions introduced and trapped therein. Clearly, it is desirable to accumulate as many ions as possible in the mass analyser in order to improve the statistics of the collected data. However, this desideratum is in conflict with the fact that there is saturation at higher ion concentrations that produces space charge effects. These space charge effects limit mass resolution and cause shifts of measured mass-to-charge ratios, thereby leading to incorrect assignment of masses and even intensities. In particular, overfilling the intermediate ion store with ions causes peak shifts in the subsequently obtained mass spectra, loss of mass accuracy in a trapping mass analyser, and saturation of the detector in a TOF mass analyser, besides mass suppression effects in the intermediate ion store itself.

One technique that addresses this problem is generally referred to as automatic gain control (AGC). AGC is the common name for utilisation of information about an incoming ion stream to regulate the amount of ions admitted to a mass analyser. This information may also be used to select mass ranges, based on spectral information. The total ion abundance accumulated within an ion trap may be controlled as follows. First, ions are accumulated over a known time period and a rapid total ion abundance measurement is performed. Knowledge of the time period and the total ion abundance in the trap allows selection of an appropriate filling time for subsequent ion fills to create an optimum ion abundance in the cell. This technique is described in further detail in U.S. Pat. No. 5,107,109.

Different variants of measuring the initial ion abundance are known, including using the total ion current in the previous spectra (U.S. Pat. No. 5,559,325); using a short pre-scan in which ions are transmitted through the trap towards the detector (WO03/019614); and measuring a part of the ions stored in storage multipole prior to FT ICR (U.S. Pat. No. 6,555,814).

In the majority of tandem mass spectrometers with accurate mass analysers, the ion population accumulated is not controlled at all. In the case of J. Proteome Res. 3(3) (2004) pp 621-626, only the total ion number prior to injection into the accurate-mass analyser could be controlled using automatic gain control. WO2004/068523 discloses an embodiment that includes an intermediate ion store used to accumulate multiple fills of an ion type from a linear trap prior to injecting all of the ions into a FT ICR mass analyser. Each fill has its own automatic gain control pre-scan prior to injecting ions into an intermediate ion store. However, its primary application is only the increase of total ion storage capacity relative to operating a single ion trap.

This leaves unattended some real-life problems. Often it is desirable to analyze more than a single type of ion, i.e. ions having a single m/z value or a m/z range. The different types of ions may be derived from different requirements according to any particular experiment. For example, the different types of ions may originate from different molecules present in a sample, from sample ions that are fragmented in tandem mass spectrometry (i.e. analysis of precursor and fragment ions), or from sample ions and calibrant ions (i.e. lock masses used for correction of mass spectra). The last case is very important as the use of internal calibrants is known to be one of the most reliable ways of improving mass accuracy (especially for TOF and EST), using analytes added or inherently present in the incoming sample. However, it is very difficult to obtain a desired abundance of internal calibrant when the analyte signal is changing rapidly, for example as with liquid separations coupled to the mass spectrometer. This poses a significant problem because accuracy of the calibrant abundance is very important: if the abundance is too low, the calibrant is useless for improving mass accuracy; if the abundance is too high, the calibrant ions occupy most of the space charge capacity of the intermediate ion store and so reduce sample utilisation. It is also very difficult to enrich ion population selectively with components of choice (e.g. impurities of interest).

With the aim of internal calibration of mass spectra, two methods of combining ions from two or more ion sources have been developed: Winger et al. (Proc. 44$^{th}$ Conf. Amer. Soc. Mass Spectrom., Portland, 1996, p. 1134) demonstrated simultaneous trapping of ions from two sources introduced into an ICR cell from two directions, as well as the combination of ions generated by electron ionisation in an ICR cell with externally injected ions. U.S. Pat. No. 5,825,026 demonstrates a mechanically switchable structure that allows ions from two ion sources to be selected for introduction into a mass analyser.

SUMMARY

Against this background, and from a first aspect, the present invention resides in a method of mass spectrometry comprising the sequential steps of: accumulating in an ion store a sample of one type of ions to be analysed; accumulating in the ion store a sample of another type of ions to be analysed; and mass analysing the combined samples of the ions; wherein the method comprises accumulating the sample of the one type of ions and/or the sample of another type of ions to achieve a target number of ions based on the results of a previous measurement of the respective type of ions.

This invention expands the scope and utility of the prior art by introducing a method according to which at least one of the ion accumulations used for mass analysis has a substantially different ion composition from that of the other accumulations. The ion "type" may correspond to a single m/z value or to a range of m/z values. The range of m/z values may be chosen to account for a single ionic species or to include two or more ionic species having similar m/z values that fall within the range. Fundamentally, the two types of ions should have different ion compositions rather than merely corresponding to repeated m/z values or ranges.

The use of sequential fills of the ion store provides several benefits. The filling conditions (e.g. transmission and capture in the ion store) may be optimized independently for each fill, particularly useful where storage of ions with vastly different masses is required (e.g. proteins as opposed to small molecules). Sequential filling also allows independent manipulation of different mass ranges chosen for different fills. For example, RF potentials may be used to increase the low-mass cut-off for a fill (say to remove matrix or solvent ions) and then may be reduced for the next fill. This invention also enables trapping of both positive and negative ions where only a single entrance aperture is available. Also, where there is a previous stage of mass analysis that operates to transmit only narrow mass windows (e.g. for precursor selection, whether it is acquired using a linear trap or a quadrupole), then this method enables storage of several different mass windows (or fragments of the corresponding precursors).

This is also useful if parallel operation of the components of the system is desired and the different parts of the system have different timing requirements, for example accommodating a system with slow detection by using the associated delay by accumulating more, different ions for simultaneous detection.

In the case of a pulsed ion source like matrix-assisted laser desorption and ionisation (MALDI), sequential filling allows a first fill of ions of analyte from a sample spot and a second fill of ions of a calibrant compound from another sample spot (the time between fills being sufficient to move a sample slide from one sample to the other).

The ions may be prepared in different ways, e.g. one type of ions may be precursor ions and the other type may be fragment ions. The conditions for producing the ions may be optimised for each type, such as selection of reaction types and conditions. For example, any of the following may be varied: collision energies, collision methods such as CID, IRMPD, ECD, and multi-collision and single-collision fragmenting.

The previous measurement, or test measurement, may be performed in many different ways, including the use of a current sensing grid, the use of induced currents, scattered ions, secondary electrons or one or more mass spectra previously acquired by the mass spectrometer. Optionally, the method may further comprise: for a particular type of the first and second types of ions, accumulating over a test injection time a test sample of the particular type of ions to be analysed, measuring the abundance of the particular type of ions so accumulated, and determining a target injection time that will result in a desired target abundance of the particular type of ions based upon the test injection time and the measured abundance of the particular type of ions; and wherein the particular type of ions are accumulated in the ion store for the target injection time before mass analysis of the combined samples.

In this way, the abundances acquired during the fills are controlled using automatic gain control (AGC). This approach, as applied to preferred embodiments of the present invention, is based on the following experimental findings. Due to collisional cooling, the final energy and spatial distribution of accumulated ions do not depend on the preceding processing of the ions, e.g. how the automatic gain control pre-scan is acquired, number of fills, sequence of filling, etc. Though these final energy and spatial distributions might depend on the composition of the ion population, the most important influence on mass accuracy of most accurate-mass analysers is exhibited by the total number of injected ions. As soon as this number is kept under control, high mass accuracy could be achieved.

Additionally this helps to match the abundances of the separately collected ions with the dynamic range of the instrument.

As well as implementing AGC when accumulating one of the ion types, AGC may also be implemented for accumulating the other ion type as well. Furthermore, the optional refinements to AGC described below may be implemented in respect of either the first or second ion types, or both.

The order of the method steps may be varied without departing from the scope of the present invention. For example, the first ion type may be accumulated, a first target injection time determined, followed by accumulating the second ion type and determining a second target injection time, and only then accumulating the first and second ion type according to their respective target injection times. Alternatively, the first ion type may be accumulated according to its target injection time prior to determining the target ion injection time for the second ion type.

The test sample and the particular type of ions may be accumulated in different ion stores. For example, the test sample may be accumulated in an ion trap. This ion trap may then be used to allow selected ions belonging to the particular type to pass to a mass analyser or an intermediate ion store where they are accumulated.

Optionally, the method may comprise operating an ion source to generate the particular type of ions and then directly transferring the generated ions to the ion store for accumulation, either just for the test injection time or just for the target injection time or for both. Rather than accumulating ions direct from the source, ions may be accumulated from other processing. For example, ions may be reacted in a reaction cell to produce the particular type of ions and these ions may then be accumulated. A dedicated reaction cell may be used, in which case the particular ions are directed to the ion store to be accumulated over the test injection time and/or the target injection time. Alternatively, a common structure may provide both the ion store and the reaction cell such that the particular type of ions is accumulated as the reaction proceeds. In this case, the reaction may be allowed to proceed for the test injection time and/or the target injection time. The reaction may take many forms, such as a reaction of sample ions with a gas phase present in the reaction cell.

Advantageously, the combined desired target abundance of the particular type of ions and the other type of ions substantially matches the storage capacity of the ion store or the optimum number of ions for operation of the final mass analyzer. The storage capacity of the ion store is likely to be related to the required performance of the ion store. For example, a higher capacity may be used if degraded performance is acceptable. In this way, the total number of ions accumulated in the ion store is at an optimum, i.e. the highest possible without space-charge effects becoming unacceptable, and/or the amount of trapped ions is distributed such that the dynamic range of the detector is optimally utilized.

Preferably, the method comprises operating a single ion source to generate both types of ions. The ion source may even use a common source material to generate the two types of ions. For example, each of the two types may be selected in turn from the range of ions produced by the ion source. Of course, separate ion sources may be used to generate each of the two types of ions.

The mass spectrometer may be operated under conditions that are favourable to the accumulation of both types of ions during respective accumulation periods. Put another way, the mass spectrometer may be operated so as to favour, either partially or wholly, the production or selection of one or other type of ions.

There are many different operational parameters of the mass spectrometer that may be tuned to favour accumulation of any particular ion type. For example, an ion source of the mass spectrometer may be operated to generate preferentially one or other type of ions. This may or may not be done at the same time as the accumulation of the ions in the ion store step. To illustrate this point, it is conceivable that ions produced sequentially by the ion source are first trapped together in an ion trap before the accumulated ions are later ejected to an intermediate ion store. As an extension of this method, a first ion source may be operated to generate the first type of ions and a second ion source may subsequently be operated to generate the second type of ions.

As a further example of how the mass spectrometer may be operated to favour accumulation of one ion type, a mass filter may be operated to select preferentially one or other type of ions. The mass filter may take one of many forms. The mass filter may correspond to an ion trap operating in an isolation mode, i.e. ions are trapped and voltages are applied that result in the selection of only ions within a certain m/z range. The mass filter may correspond to ion optics operated to transmit preferentially the first type and/or the second type of ions, e.g. by setting DC and/or AC voltages such that only ions of required m/z values can pass.

Optionally, either or both of the test samples of ions are accumulated in a further ion store and may then be ejected to a separate mass analyser for mass analysis.

In an application of the present invention, one of the ion types is an internal calibrant and the other ion type is a sample to be analysed.

This method may be used in tandem mass spectrometry and $MS^n$ spectrometry. Thus, one type of ions are parent ions and the other type are product ions (or fragmenting, these terms being synonymous). Optionally, product ions from more than one type of parent ion may be accumulated.

The above methods may be extended to more than two accumulations and more than two types of ions. For example, three or more types of ions may be accumulated sequentially. Furthermore, more than a single accumulation may be used to acquire ions of a particular type.

BRIEF DESCRIPTION OF THE DRAWINGS

In order that the invention may be more readily understood, preferred embodiments will now be described, by way of example only, with reference to the accompanying drawings in which.

DETAILED DESCRIPTION OF ILLUSTRATIVE EMBODIMENTS

Figure 1:
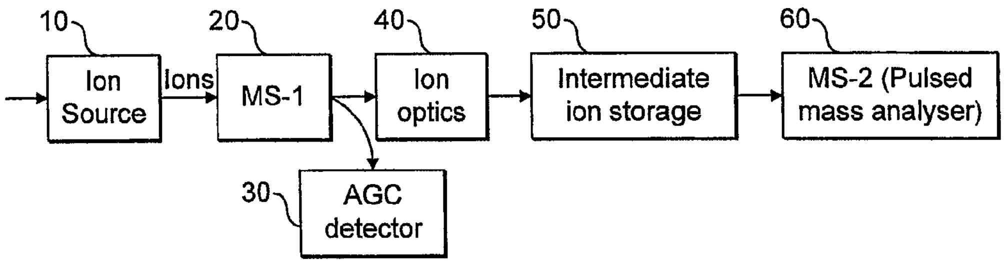
FIG. 1 PRIOR ART
FIG. 1 is a schematic view of a tandem mass spectrometer according to the prior art.

A known tandem mass spectrometer on which the invention according to some of its aspects may be practised is shown in FIG. 1. Ions from a pulsed or continuous ion source 10 are admitted to a mass analyser 20 that has mass analysis and mass selection functionality and where, optionally, fragmentation may be performed. Alternatively, a separate reaction cell may be used to perform fragmentation. Ion source 10 could be a MALDI source, an electrospray source or any other type of ion source. In addition, multiple ion sources may be used. Also, the mass analyser 20 may be preceded by any number of stages of mass analysis, and/or ion manipulation.

All embodiments of the invention may be operated with an automatic gain control detector 30 to trap an appropriate number of ions. Any of the known AGC methods may be used to determine the optimum ionisation time for subsequent fills. In this application, AGC is interpreted in a most general way as a method of determining an optimum fill time based on sampling a set of ions. Therefore, it includes not only methods based on information from a pre-scan or previous scan, but includes other methods of measuring numbers of ions such as a current sensing grid that intercepts (preferably uniformly) the ion beam; sensing induced currents; sensing scattered ions, for example on apertures; sensing secondary electrons; and using a previous analytical scan taken by the mass analyser 20. The possible methods also include those described previously herein. Ions produced using the optimum ionisation time may be fragmented in the mass analyser 20, for example by collision-induced dissociation. Ions are transferred from the mass analyser 20 via transfer optics (e.g. RF multipole 40) into an intermediate ion store 50 where they are captured and trapped. The intermediate ion store 50 is followed by an accurate mass analyser 60.

Figure 2:
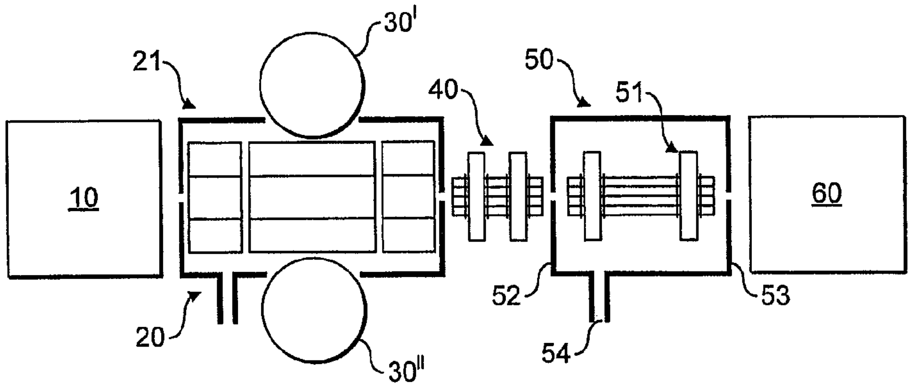
FIG. 2 is a schematic view of a tandem mass spectrometer according to a first embodiment of the present invention.

A first embodiment of the present invention is practised on a tandem mass spectrometer broadly similar to that of FIG. 1 and that is shown in FIG. 2. In this embodiment, the mass analyser 20 corresponds to an ion trap 21. The ion trap 21 is a linear segmented quadrupole with radial ejection to dual detectors (30' and 30"), as described in US2003/0183759. The intermediate ion store 50 includes a multipole 51 operated with RF voltages to create a trapping field. Electrodes at either end of the multipole 51 operate as a gating electrode 52 and a trapping electrode 53 respectively. The intermediate ion store 50 is filled with gas via tube 54, preferably at pressures below $10^{-2}$ mbar. When ions are accumulated in the store 50, the ions are reflected by elevated voltages placed on trapping electrode 53 and gating electrode 52 such that they remain within multipole 51. During transits between reflections, the trapped ions lose their energy in collisions.

It should be noted that at lower pressures, e.g. below $10^{-3}$ mbar, ions may require more than a single passage from trap 21 to multipole 51, i.e. the ions may require multiple reflections between the ends of the trap 21 and multipole 51. Our co-pending patent application, GB0506287.2, describes such reflection trapping. Essentially, the ions lose energy through collisions, and are accumulated in a desired location by ensuring that the minimum of a potential well coincides with this location (the intermediate ion store 50 in this case).

Mass analysis of a sample is performed using the mass spectrometer 60 of FIG. 2 in accordance with an embodiment of the present invention as follows.

A sample of a first type of ions produced by the ion source 10 are admitted into the first mass analyser 20 over a predetermined time interval. The total ion abundance within the mass analyser 20 is then measured using the AGC detector 30.

A processor or similar (not shown) calculates the required time interval required to achieve a desired ion abundance. Generally, this ion abundance is related to the optimum ion abundance for the accurate mass analyser 60 or intermediate ion store 50 bearing in mind space charge effects that result from overfilling any particular trapping volume. The desired ion abundance for the first type of ions will be a fraction of the total optimum ion abundance in view of the subsequent fills of other types of ions. If the mass analyser 20 has a smaller capacity than the intermediate ion store 50 and/or the mass analyser 60, more than one fill of the mass analyser 20 may be required to achieve the desired ion abundance.

Thus, the ion source 10 again fills the mass analyser 20 over the required time interval to achieve the desired ion abundance, where they are trapped. The ions are then ejected to the intermediate ion store 50, via the ion optics 40, where they are trapped once more. Hence, the first cycle of ion processing is complete with the desired abundance of the first type of ions trapped in the intermediate ion store 50.

In the next cycle of its operation, ion trap 21 could carry out a different experimental sequence, e.g. isolation of a single m/z ratio, fragmentation in gas collisions, etc. This experiment is also performed under AGC control so that the number of resulting ions is controlled to achieve a desired abundance for the second type of ions. After the end of the sequence, ions are transferred to the intermediate ion store 50 where ions from the previous cycle reside. These ions from the second fill lose their energy in collisions and get stored in exactly the same way as ions from the first fill. Unless the number of ions already stored in the multipole 51 of the intermediate ion store 50 is close to its space charge capacity, the storage process will be carried out in the same way. However, the space charge capacity of multipole 51 typically exceeds $10^7$ ions or more. This is higher than normally allowed for acceptable operation of accurate-mass analysers. The ions are then ejected to the accurate mass analyser 60 for mass analysis.

The mass analyser 20 has been described as an ion trap 21 above. If the mass analyser 20 is of a transmission type (e.g. quadrupole mass spectrometer), then the ion optics 40 should be configured in such a way that they stop ions from entering the intermediate ion store 50 and divert the ions to reach the AGC detector 30 during an AGC pre-scan.

Figure 3:
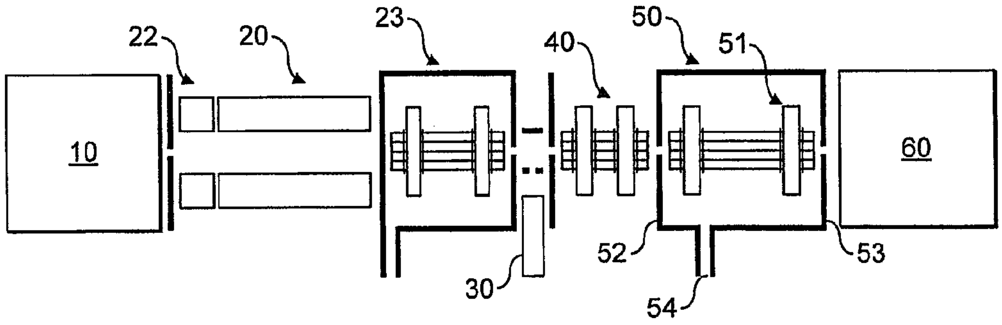
FIG. 3 is a schematic view of a tandem mass spectrometer according to a second embodiment of the present invention.

An embodiment of a mass spectrometer with a transmission-type mass analyser 22 is shown in FIG. 3. In this embodiment, quadrupole mass analyser 22 is preferably followed by a RF-only collision cell 23. The appropriate filling time of the intermediate ion store 50 is deduced from the ion abundance measurements taken by the AGC detector 30. Ion optics 40 are then switched into transmission mode to allow ions to enter a multipole 51 of the intermediate ion store 50 for this duration, where they are trapped as described above. After that, the ion optics 40 are switched again into ion rejecting mode and this concludes the first fill.

The only difference from the filling process described for the trapping mass analyser 22 above is dictated by the greater difficulty of providing multiple passages between mass analyser 22 and multipole 51. Therefore, higher gas pressure in the multipole 51 is preferable when no collision cell 23 is present.

For the second fill, the mass analyser 22 is switched to transmit a different m/z value or m/z range, and the cycle of filling multipole 51 is repeated. Each fill has its own AGC pre-scan prior to allowing ions into the intermediate ion store 50 to ensure the desired ion abundances are achieved for each ion type.

Due to collisional cooling in the multipole 51, the final energy and spatial distribution of the trapped ions does not depend on the type of mass analyser 22, number of fills, sequence of filling, etc. However, it might depend on the composition of ion population, collision gas and operating parameters of the intermediate ion store 50. It is especially important to ensure the absence of uncontrolled interactions between stored ions and volatile contaminants in the collision gas.

After the required number of fills (that may be more than two), voltages on the intermediate ion store 50 are altered in such a way that all stored ions are injected together into the accurate mass analyser 60. The actual embodiment of the intermediate ion store 50 has to match the acceptance of the corresponding mass analyser 60.

Figure 4:
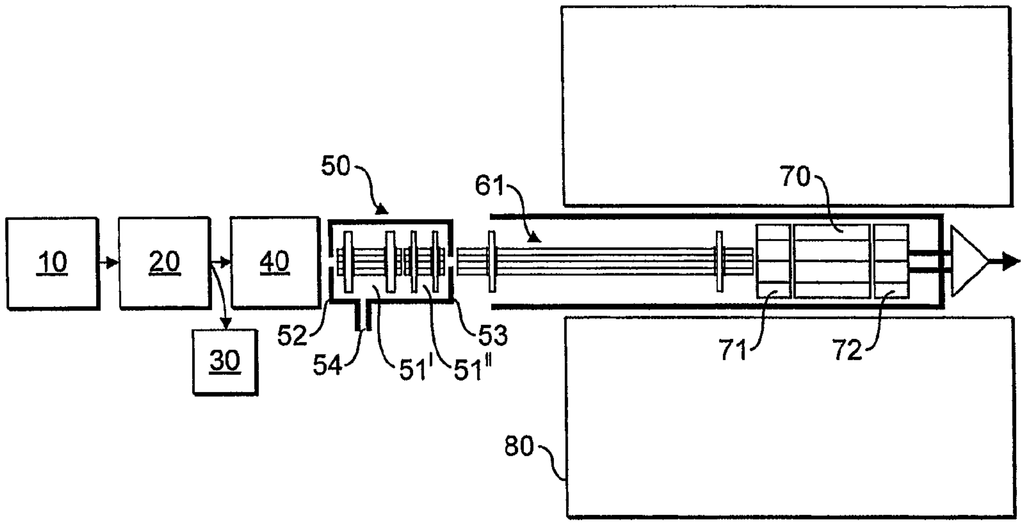
FIG. 4 is a schematic view of a tandem mass spectrometer according to a third embodiment of the present invention.

The preferred embodiment of a tandem mass spectrometer with a FT ICR mass analyser 70 is shown in FIG. 4. Ion source 10, mass analyser 20 (that may be of trapping type 21 or transmission type 22), AGC detector 30 and ion optics 40 are shown schematically, and they may follow either FIG. 2 or 3. The intermediate ion store 50 in FIG. 4 contains a multipole

51, preferably comprising two segments 51' and 51". The latter is located closer to the trapping electrode 53. During storage, this latter segment 51" has a lower DC offset (for positive ions) so that ions reside mainly along its length. For ion injection into the FT ICR cell, the voltage on electrode 53 is lowered below the offset of segment 51" and all stored ions are admitted into an ion guide 61 and then into FT ICR cell 70 in the middle of magnet 80 (preferably, a super-conducting magnet). After ions enter the cell 70, they are trapped in a conventional way, namely by raising voltages on end electrodes 71 and 72. Detection and data processing follow according to the known prior art.

Figure 5:
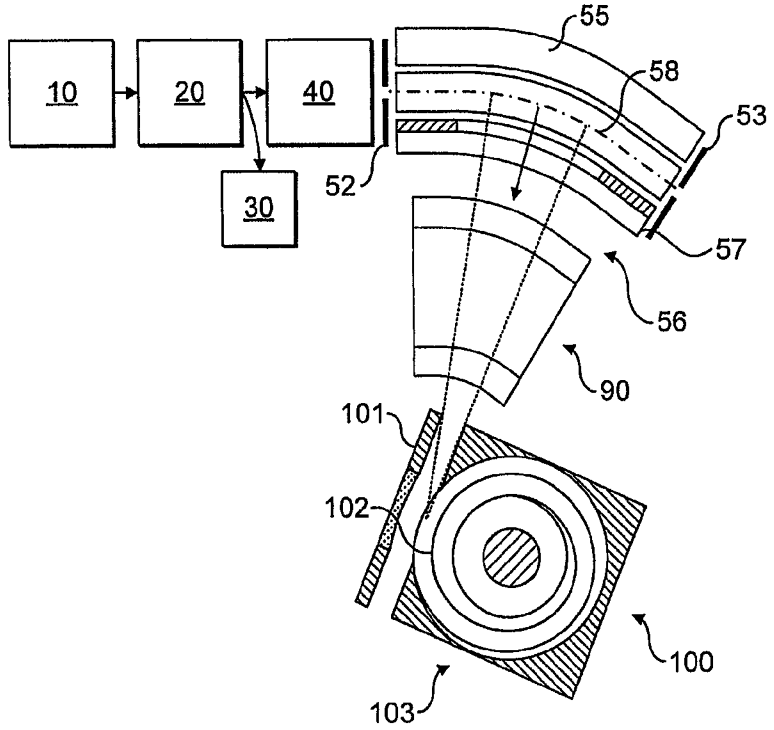
FIG. 5 is a schematic view of a tandem mass spectrometer according to a fourth embodiment of the present invention.

A preferred embodiment of a tandem mass spectrometer with electrostatic trap mass analyser 100 such as an Orbitrap mass analyser is shown in FIG. 5. In this embodiment, the intermediate ion store 50 contains a curved quadrupole 55 with a slot in the inner electrode 56. Prior to ion injection, ions could be squeezed along the axis of quadrupole 55 by raising voltages on apertures 52 and 53. For ion injection into the Orbitrap mass analyser 100, the RF voltage on the quadrupole 55 is switched off as is well known. Pulses are applied to electrodes 56, 57 and 58 so that the transverse electric field accelerates ions into curved ion optics 90. The converging ion beam that results enters the Orbitrap mass analyser 100 through injection slot 101. The ion beam is squeezed towards the axis by an increasing voltage on a central electrode 102. Due to temporal and spatial focusing at the injection slot 101, ions start coherent axial oscillations. These oscillations produce image currents on electrodes 103 that are amplified and processed, as described in WO02/078046 and U.S. Pat. No. 5,886,346.

Figure 6:
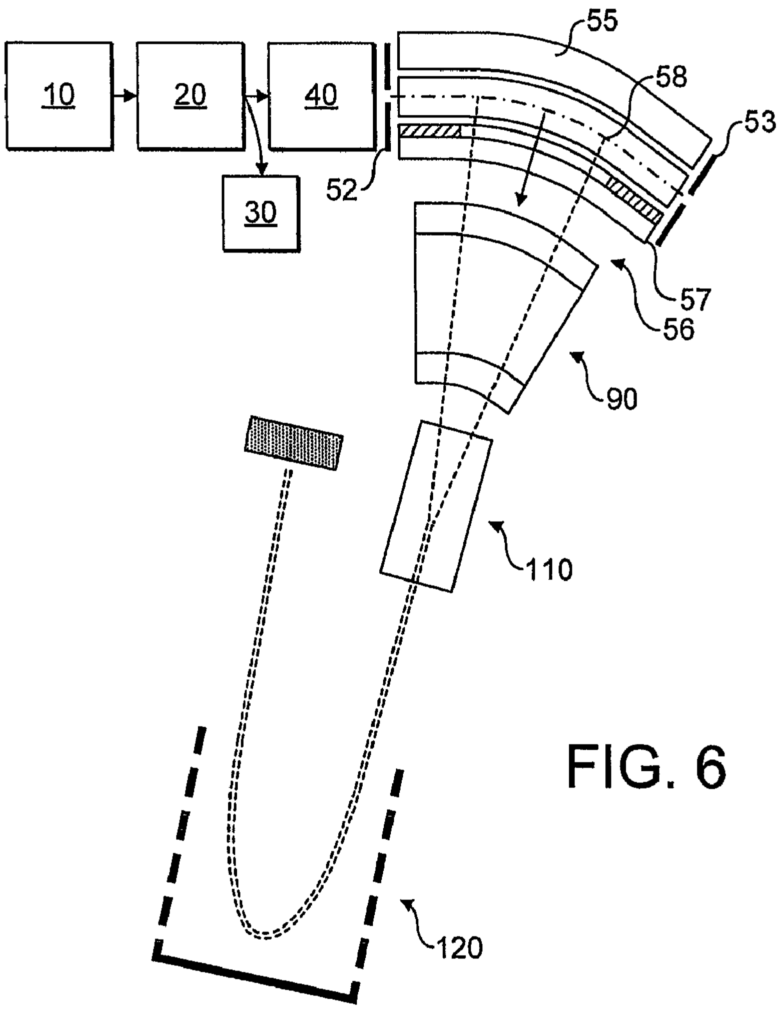
FIG. 6 is a schematic view of a tandem mass spectrometer according to a fifth embodiment of the present invention.

A preferred embodiment of a tandem mass spectrometer with a TOF mass analyser 120 is shown in FIG. 6. In this embodiment, construction and operation of the intermediate ion trap 50 is similar to that in FIG. 5. In contrast to the embodiment of FIG. 5, additional focusing ion optics 110 transform the converging ion beam into a beam with smaller angular spread. This beam is then analysed in the TOF mass analyser 120 that may be of any known type, and with either single or multiple reflections. It is also possible to use a quadrupole 55 in the intermediate ion store 50 with a very shallow curvature, i.e. with straight or almost straight rods.

Figure 7:
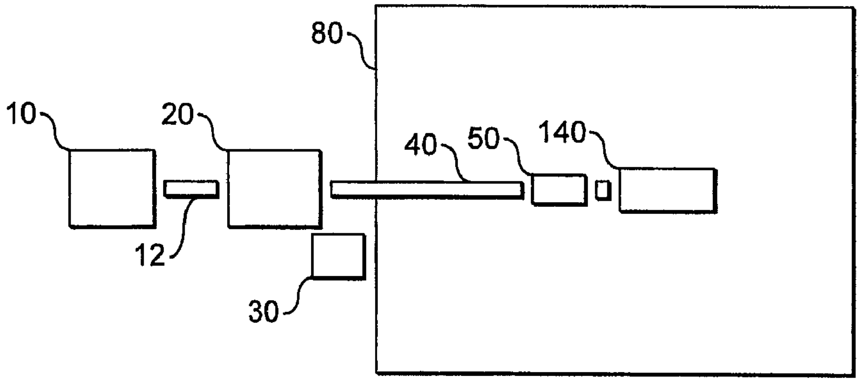
FIG. 7 is a schematic view of a tandem mass analyser according to a sixth embodiment of the present invention.

Another preferred embodiment of a tandem mass spectrometer according to the present invention is shown in FIG. 7. Ions from an ion source 10 are guided through an optional ion guide or ion optics 12 to a first ion trapping mass analyser 20, 30. This can be used to perform pre-scans, perform ACG with detector 30, select and manipulate ion processes, as described previously. From the mass analyser 20, ions are transferred through an optional ion guide or ion optics 40 to an intermediate trap 50. The transfer method can be for example the multi-reflective trapping method described in our co-pending application GB 0506287.2, the fast wide-range injection of our co-pending application WO2004/081968, a moving virtual ion trap transfer or any other suitable transfer method. The intermediate trap 50 is located inside a superconducting magnet 80 preferably close to an ICR cell 140 as suggested by Wanczek et al. (Int. J. Mass Spectrom. Ion Processes, 87 (1989) 237-247). The intermediate trap 162 could be a magnetic trap, a RF trap or preferably a so called "combined trap" with RF storage and a strong magnetic field, e.g. a short segmented multipole RF ion guide with trapping plates at both ends.

This intermediate trap 50 is used to collect the multiple injections from the source 10, prepared and selected by the components 12 to 50. When the desired ion population is reached, ions are ejected through optional ion optics, ion guides and differential pressure stages towards the ICR cell 140 for subsequent storage and detection. Besides the other advantages of this invention, this arrangement is especially well suited to avoid time of flight problems usually found in FT-ICR, thus allowing the creation of ion populations in the FT-ICR cell 140 that can cover a wide mass range and have the expected intensity ratios of the injected components.

Possible applications of the multiple filling of the intermediate ion store 50 according to the embodiments include, though are not limited to the following.

1. Reliable Introduction of Internal Calibrant

In this case, one of the ion fills is dedicated to accumulating only ions of an internal calibrant.

The use of internal calibrants, also known as "lock masses", increases the mass accuracy of many mass spectrometers. Lock masses can be introduced in various ways. For example, the internal calibrant may be in the same ion stream as the sample to be analysed, and is only enriched or depleted, for example ubiquitous background ions in chromatography. Alternatively, chemical reactions may be used to generate the calibrant. The internal calibrant may be taken from a different ion stream, such as an ion sprayer or "dual sprayer", and may be matched in intensity or generating lock masses by CI. It is desirable to be able to adapt the amount of lock mass that is introduced into the system to the amount of analyte.

Mass spectrometers may be operated such that (i) a sample is introduced to a desired abundance using AGC, (ii) a reference is introduced to a desired abundance using AGC, and (iii) the previously introduced ions are mass analyzed together.

The mass analyser 20 selects only a narrow m/z window (preferably 1 Th) corresponding to the calibrant until the required ion abundance is reached. This required ion abundance could be a fixed proportion (e.g. 10%) of the total ion abundance, but it should not be less than the minimum imposed by the required mass accuracy (normally, 1,000 to 10,000 ions in a mass peak for mass accuracy 0.5 to 2 ppm, depending on mass analyser).

The lock mass and sample may have different "target" ion abundances, in which case using more than one lock mass may be advantageous. Multiple lock masses may be taken from one source/injection and selected by a suitable waveform (multi-ion isolation, e.g. SWIFT). The multiple lock masses may be injected separately.

The reference may be used to improve the mass spectrum and, optionally, display of reference masses may be suppressed to make interpretation more convenient for the user.

More advanced experiments are possible, such as multi-parent MS/MS, mass range extension, and use of an additional mass from the parent spectrum (full scan) as calibration ions in the MS/MS scan (collect selected ion(s) and MS/MS of different ion(s)). Other schemes may be implemented that take advantage of using AGC. For example, target abundance calculations for the calibrant(s) may be made dependent on pre-scan information, swift waveform or other selection of reference mass patterns, or smart pre-scan orders.

Collecting precursor scan ions or other calibration ions together with product ions solves a significant problem that currently is found on most $MS^n$ devices. This problem is the introduction of calibration masses into product spectra, as normally calibration masses are lost during isolation or fragmentation.

2. Multiple MS/MS Experiments in a Single Spectrum of Accurate-Mass Analyser

Each fill corresponds in this case to a different energy or even method of collisional activation of the precursor ion of choice. For example, the first fill could be made for fragments formed in the mass analyser 20 by resonance excitation, which provides increased representation of higher-mass fragments. The second fill could be made for precursor ions injected into the intermediate ion store 50 at high kinetic energies as described in WO2004/068523 (preferably above 0.030 eV/Th). As the latter provides better representation of immonium and lower-mass fragments, the best overall coverage is achieved.

Each fill could correspond to an incremental change in activation or collision energy such that the final ion population corresponds to an entire activation/collision energy range. This method allows acquisition of a "collisional energy scan" in a single spectrum of the mass analyser and maximises sequence coverage. Also, additional fragmentation methods could be used for some fills, for example IR multi-photon dissociation, electron transfer dissociation, electron-capture dissociation, etc. The latter could be arranged within the mass analyser 20, the ion optics 40, or the intermediate ion store 50. Providing additional dimensions of structural information, these methods could be used in combination with multiple filling as a powerful tool for de-novo sequencing of peptides and proteins.

With increasing ion number, the mass analyser 20 loses ability to select precursor ions with high resolution (e.g. 1 Th). On the other hand, a high number of stored ions could be very useful for identifying low-intensity fragmentation products. Multiple fills allows this problem to be avoided by splitting the required total ion abundance into a number of smaller subsets, each within the space charge limit of the high resolution selection.

3. Multiple-Parent MS/MS in a Single Spectrum of Accurate-Mass Analyser

An entire mass range is split into a number of sub-ranges, each corresponding to its own precursor ion. Within each MS/MS cycle of the mass analyser 20, only fragment ions of the corresponding m/z sub-range are stored and then transferred to the intermediate ion store 50. After all ions from these multiple fills are injected into the accurate mass analyser 60, each precursor ion could be identified according to its accurate mass and the accurate mass of its partial sequences from the corresponding sub-range. As a numerical example, an entire mass range of 100 to 2000 Th could be split into sub-ranges 100 to 200, 200 to 400, 400 to 600 . . . 1800 to 2000 Th. Each of these ranges is wide enough to contain at least a precursor ion and one to three of its fragments. In this way, loss of for example phosphate group is also easily identified. Altogether, such an approach increases the MS/MS throughput by an order of magnitude while still retaining the specificity of identification.

A further preferred embodiment is multiple reaction monitoring using the accurate mass analyser 60. In this case, the purpose of the measurement is to confirm the presence of certain analytes by monitoring both the precursor ion and one or more of its fragments, each of them having known m/z (or known neutral loss, etc.). Ion trap 20 selects a pre-determined number of particular precursor ions which are then fragmented at optimum collision conditions for that precursor and stored in the intermediate ion store 50. The cycle is repeated for multiple precursor ions so that the final population in the intermediate ion store 50 contains MS/MS fragments of multiple precursors (preferably 5 to 50 of them), wherein each set of fragments could be produced at different collision conditions. The resulting population is then injected into the accurate-mass analyser 60 and detected therein. Monitoring of particular reactions is carried out using accurate masses of corresponding precursor and fragment ions of interest (or their difference). Possible overlap of mass peaks is avoided by using the mass analyser 60 at high resolution (preferably 10,000 to 100,000 or 10,000-1,000,000) as well as by a preliminary check of uniqueness of each m/z of interest between all targeted sets of ions in that single accurate-mass spectrum.

This application of multiple filling, and the multiple MS/MS experiments in a single spectrum of accurate mass analyser described above are most useful when the detection time is significantly larger than the collection time. A further use for these two applications is first taking a full scan, then taking a MS/MS scan including an injection of a certain amount of parent ions. This allows internal calibration of the MS/MS scans.

4. Ion-Ion Reactions in the Intermediate Ion Store

If the RF multipole 51 in the intermediate ion store 50 consists of at least two segments 51' and 51" (like that shown in FIG. 4), then it is possible to trap ions of opposite polarities. Setting a DC offset on segment 51" lower than that of segment 51' and aperture 53 allows positive ions to be stored along the length of the former segment 51". If the polarity of the ion source 10, mass analyser 20 and ion optics 40 is reversed, it becomes possible to introduce negative ions. In this case, negative ions will be stored between aperture 52 and segment 51". Finally, DC voltages on apertures 52 and 53 are replaced by RF voltages, and offsets on 51' and 51" are switched to the same level as the DC offsets of apertures 52 and 53. Due to the known number of reactant ions, the final number of ions could be predicted also though with lower accuracy (see below). Product ions of one polarity are then injected into the accurate mass analyser 60.

In order to increase the speed of switching between negative and positive ions, it is preferable to avoid switching any high voltages. For an electrospray source, this could be achieved by using two sprayers operating in parallel, one at a positive high voltage, the other at a negative high voltage, relative to the orifice from atmosphere into vacuum. While both sprayers operate in a continuous and stable mode, only ions of one polarity are able to reach the first mass analyser 20.

5. Improvement of Ion Number Control for Fragmentation Outside the Mass Analyser 20

If ion population is altered in any way downstream of the AGC detector 30, then ion abundance control becomes much worse, with an adverse effect on mass accuracy. To avoid this, on-line calibration of the resulting ion abundance is required. This is done by transferring the resulting ions from the intermediate ion store 50 back into the AGC detector 30, measuring total ion abundance and then altering the incoming ion current correspondingly. Examples of such ion alterations downstream of the AGC detector 30 include: high energy collision-induced dissociation in the intermediate ion store 50; ion-ion reactions as described above, or with an additional external ion source; reactions with neutral gas (depletion of single-charged species or clusters, reactions with isotopically-labelled gas, analyte-specific reactions, etc.); surface-induced dissociation; IR multi-photon dissociation; electron-capture or electron-transfer dissociation; or any other type of fragmentation. The type may be selected according to an ion type and operated optimally for that ion type.

This transfer backwards to the AGC detector 30 is especially helpful with multiple injection methods.

6. Improvements in Spectrum Stitching

This invention provides an alternative to spectrum stitching, i.e. combining more than one mass spectra taken by a mass analyser to allow presentation as a single mass spectrum. This invention allows two or more mass ranges to be selected from the ion stream, and may include exclusion of intense peaks, enrichment of low intensity areas, or increased mass range. Different mass ranges may be accumulated to provide different numbers of ions, and a subsequently-acquired mass spectrum may be presented with relative intensities of peaks adjusted accordingly. The mass ranges may then be accumulated together and analysed together in the mass analyser rather than having to acquire separate spectra and later having to combine data using processing means.

Adjustment of peaks in a mass spectrum may be used in many applications, and not just with the 'spectrum stitching' described here. For example, peaks of interest may be intensified or unwanted/trivial peaks may be attenuated or even removed by appropriate control of the numbers of incurring ions responsible for those peaks. In addition, the peaks may be manipulated when displayed as a mass spectrum through use of the operational parameters stored when the ions were processed prior to the mass analyser 60 acquiring the data.

7. Improvements in Analyte Utilisation

The mass analyser 60 following the intermediate ion store 50 could be operated in such a way that at least some of injected ions are returned back to the intermediate store 50 for further accumulation. This is especially applicable to mass analysers of the TOF type, and mainly when further stages of mass analysis are envisaged downstream. This approach improves utilisation of low-intensity signals.

For each of the above cases, selection of the types of ions from which mass spectra will be obtained may be based on information obtained from previous mass spectra. For example, this information may include any of or any combination of mass, charge, m/z, ion currents, rank in mass spectrum, isotopic pattern, total ion currents, chromatographic peak rise-time and so on. The previous mass spectrum could correspond to a short pre-scan in which ions are transmitted through the ion trap 20 towards the mass analyser 60, akin to the method described in WO03/019614.

Parallel processing of ions may be employed to increase throughput of the mass analyser, as described in our Patent Application PCT/EP04/010735. For example, different parts of the ion processing may be performed concurrently such that ions are generated and accumulated while a previously accumulated set of ions are being reacted at the same time as a mass spectrum is being obtained from a previously reacted set of ions.

As will be appreciated by the person skilled in the art, variations may be made to the embodiments described above without departing from the scope of the present invention.

The invention claimed is:

1. A mass spectrometer, comprising:

an ion source for generating ions;

a mass selector for receiving ions from the ion source and passing ions within a selected range of mass-to-charge ratios;

a controller for causing the mass selector to sequentially pass a first type of ions having a first selected range of mass-to-charge ratios and a second type of ions having a second selected range of mass-to-charge ratios different from the first selected range of mass-to-charge ratios;

an ion store for combining and trapping the first and second types of ions or ions derived from the first and second types of ions, and for releasing the combined ions; and a pulsed accurate mass analyzer for receiving the combined ions from the ion store and for measuring the mass-to-charge ratios of the combined ions to produce a mass spectrum of the combined ions;

wherein the mass selector is selected from a group consisting of a quadrupole mass filter and an ion trap.

2. The mass spectrometer of claim 1, wherein at least one of the first and second types of ions include calibrant ions of known mass-to-charge ratio, and the step of producing a mass spectrum of the combined ions includes adjusting the measured mass-to-charge ratios of the combined ions based on the measured mass-to-charge ratio of the calibrant ions.

3. The mass spectrometer of claim 1, further comprising a collision cell disposed in the ion path between the mass selector and the ion store and configured to cause fragmentation of a portion of at least one of the first and second types of ions.

4. The mass spectrometer of claim 1, wherein the pulsed accurate mass analyzer includes an electrostatic trap mass analyzer.

5. The mass spectrometer of claim 1, wherein the pulsed accurate mass analyzer includes a time-of-flight (TOF) mass analyzer.

6. A method of mass spectrometric analysis, comprising steps of:

fragmenting a first group of precursor ions having a first mass-to-charge ratio range using a first set of fragmentation parameters to produce a first group of product ions;

fragmenting a second group of precursor ions having a second mass-to-charge ratio range using a second set of fragmentation parameters to produce a second group of product ions;

accumulating and combining the first and second groups of product ions; and mass analyzing the combined product ions to generate a mass spectrum;

wherein the first and second sets of fragmentation parameters differ from each other.

7. The method of claim 6, wherein the first mass-to-charge ratio range is substantially identical to the second mass-to-charge ratio range.

8. The method of claim 6, wherein the first mass-to-charge ratio range differs from the second mass-to-charge ratio range.

9. The method of claim 6, wherein the first set of fragmentation parameters includes a collision energy that differs from the collision energy of the second set of fragmentation parameters.

10. The method of claim 6, wherein the first set of fragmentation parameters includes a fragmentation method that differs from the fragmentation method of the second set of fragmentation parameters.

11. A method of mass spectrometric analysis, comprising:

accumulating a first group of ions having a first mass-to-charge ratio range for a first accumulation period;

accumulating a second group of ions having a second mass-to-charge ratio range for a second accumulation period, the first mass-to-charge ratio being different from the second mass-to-charge ratio and the first accumulation period being different from the second accumulation period;

combining the accumulated first and second groups of ions, or ions derived therefrom;

mass analyzing the combined ions to produce a mass spectrum; and adjusting intensities of peaks in the mass spectrum in accordance with the accumulation periods of the associated ion species.

12. The method of claim 11, wherein the step of accumulating a first group of ions includes operating a quadrupole mass filter to selectively transmit ions having the first mass-to-charge ratio range, and wherein the step of accumulating a second group of ions includes operating the quadrupole mass filter to selectively transmit ions having the second mass-to-charge ratio range.

13. The method of claim 11, wherein the first and second accumulation periods are selected to intensity in the mass spectrum at least one peak corresponding to an ion species of interest.

14. The method of claim 11, wherein the first and second accumulation periods are selected to attenuate in the mass spectrum at least one peak corresponding to an unwanted ion species.

* * * * *